United States Patent [19]
Schliesser et al.

[11] Patent Number: 5,699,723
[45] Date of Patent: Dec. 23, 1997

[54] DEVICE FOR MAKING SAUSAGES

[75] Inventors: Gerhard Schliesser, Wain; Karl Burger, Ingoldingen-Muttensweiler, both of Germany

[73] Assignee: Albert Handtmann Maschinenfabrik GmbH & Co. KG, Biberach, Germany

[21] Appl. No.: 645,176

[22] Filed: May 13, 1996

[30] Foreign Application Priority Data

May 18, 1995 [DE] Germany .................... 295 08 293 U

[51] Int. Cl.$^6$ .................... A23B 4/044; A22C 11/12
[52] U.S. Cl. .................... 99/443 C; 99/477; 99/482; 452/48
[58] Field of Search .................... 99/482, 477, 443 C, 99/467; 452/46, 47, 48

[56] References Cited

U.S. PATENT DOCUMENTS

| 3,276,352 | 10/1966 | Allen et al. | 452/48 X |
| 4,017,941 | 4/1977 | Raudys et al. | 452/48 X |
| 4,612,684 | 9/1986 | Kollross | 452/48 X |
| 5,092,813 | 3/1992 | Kasai et al. | 452/46 |

*Primary Examiner*—Reginald L. Alexander
*Attorney, Agent, or Firm*—Tilton, Fallon, Lungmus & Chestnut

[57] ABSTRACT

The present invention relates to a device for supplying sausage strings made coherently in chains to a smoke stick, the device comprising a transportation device including rotating transportation hooks to which the sausages are transferred. To facilitate the closing of sausages, especially of natural skin sausage strings, the device for closing is arranged on the transportation device to be movably supported at least over part of the longitudinal extension of the transportation device.

5 Claims, 1 Drawing Sheet

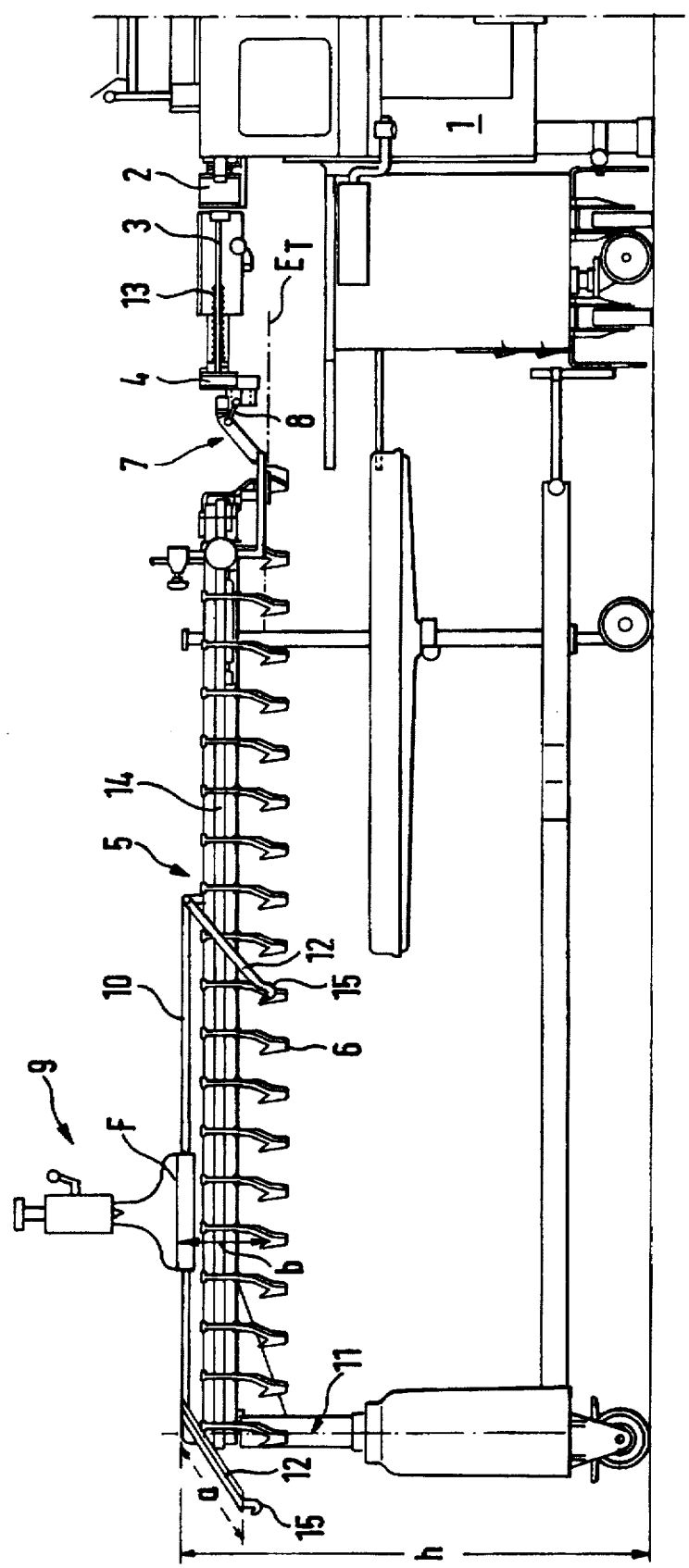

DEVICE FOR MAKING SAUSAGES

The present invention relates to a device for supplying sausage strings made coherently in chains to a smoke stick, the device comprising a transportation device including rotating transportation hooks to which the sausages are tranferred.

Devices for supplying sausage strings made coherently in chains to a smoke stick are known in various embodiments, e.g. from European patent 0482 368 filed by the same applicant. The amount of sausage meat exiting from the filling tube of a portioning and filling machine is transferred into a skin or casing which is removed from the filling tube. Depending on the size of the portion, neckings can be produced by activating a twist-off gear. The resultant sausage chains are handed over in loops to a transportation device in order to be taken over by a smoke stick. Hanging onto the smoke stick, the sausage loops can be passed into the smoking chamber for further treatment of the sausages.

As described in this patent, the transportation device comprises a transportation belt which rotates in a horizontal plane and to which transportation hooks are hung at an adjustable distance relative to one another for conveying the incoming sausage loops to the end of the transportion device that faces away from the machine. At the same time, they can be guided over a smoke stick, but it is also possible to push the smoke stick by hand into the sausage loops as formed.

At the beginning and end of a sausage string, the skin ends must be closed at said locations. To this end, closing means, such as hand clippers or stationary clippers, are used, with the resultant difficulty that the sausage loops have then to be moved to said closing means.

Especially when sausages are made with natural skins, closing devices, hereinafter shortly called clippers, are often needed because clipping is not only required at the beginning and end of a skin length, but frequently in the case of sausage bursting in between at the neckings to the right and left of the place where the skin has been damaged.

When sausages are made with natural skins, the closing process is therefore especially troublesome and thus time-consuming.

It is the object of the present invention to provide a device of the above-mentioned type in the case of which the closing process is simplified, especially in the area of burst locations, but also at the beginning and end of a sausage string, especially a natural skin sausage string.

This object is achieved in that a device for closing is arranged on the transportation device to be movably supported at least over part of the longitudinal extension of the transportation device.

With this measure the clipper is moved as close as possible to the place where a closing operation is needed. Since the clipper is arranged on the transportation device such that it can be displaced, it is possible to move the clipper as close as possible to the beginning or end of a sausage string. The sausage string can then be closed just by clipping at the corresponding locations without having to be removed from the transportation device as a whole.

In an advantgeous development of the invention, the device for clipping is arranged at a height corresponding to the standard working height of a standing person (80 cm–140 cm) on a support around which the transportation hooks rotate continuously, being guided on a transportation belt. This permits an easy access and ergonomic working.

In other development of the invention, spaced-apart holding arms are arranged on the transportation device approximately at the working height of the closing device for receiving a smoke stick. As a consequence, the sausage loops can first be passed to the smoke stick and the smoke stick can then be removed and hung onto the holding arms, the suspended smoke stick coming to rest in the direct vicinity of the clipper, whereby easy clipping is made possible.

The distance between a smoke stick received on the holding arms and the clipper device is preferably about 10 to 25 cm, so that the distance between smoke stick and clipper can be overcome with a conventional sausage length. Moreover, the minimum distance between transportation hook and clipper can be chosen to be correspondingly short, so that a clipping operation from the transportation hooks is also possible.

The invention shall now be explained and described in more detail with reference to the embodiment illustrated in the drawing.

The sole figure of the drawing is a schematic lateral view on a sausage processing device according to the invention. In the sausage and portioning machine 1 sausage is discharged in a manner known per se via a filling tube 3 over which a skin worm 13 is pulled. The sausage meat can be filled in portions into the skin or casing via a twist-off gear 2 and a brake ring 4. The coherent sausage chains formed behind brake ring 4 are transmitted via transfer means 7 and 8 to the transportation device 5. Such a transportation device for conveying sausage loops is e.g. described in European patent application 482 368, which is herewith explicitly referred to.

The sausage is hung in loops over the individual transportation hooks 6, whose distance can be adjusted. The transportation hooks are transported via the endless transportation belt 14 to the left in the drawing. According to the invention a clip device 9 is movably supported on the transportation device at least over part of the longitudinal extension of the transportation device. The clip device consists of a commercially available clipper as is used in the meat processing trade for making closed ends in sausages. This clipper is displaceably arranged on guide rails 10 on the upper side of the transportation device at a height h and can thus be freely moved in the illustrated embodiment between the two holding arms 12.

The holding arms 12 which, in contrast to the remaining drawing in FIG. 1, are shown in perspective, projecting at the viewer side, serve to receive a smoke stick hung with sausage loops with the aid of their hooks 15. Distance a which is defined by the length of the holding arms 12 is chosen such that during operation a single sausage can easily be seized from a hanging sausage loop and pulled to the closing surface F of clipper 9, so that clipping is easily possible without the need to move a whole sausage chain.

Height h at which the clip device is arranged corresponds to a standard working height of about 1 m to 1.40 m, so that easy working is possible.

It is possible to work with this device as follows:

Machine 1 ejects in a per se known manner, and at a specific rate, sausages formed in coherent sausage chains, which come to rest automatically in loops on hooks 6 of the transportation device by suitably coordinating the belt drive speed of the transportation device with the machine speed (see the already mentioned European patent application 482 368) and are transported by the transportation device to the left in the drawing. During transportation it is possible either to already introduce a smoke stick into the forming loops automatically, as described in the above-mentioned European patent application, or to thread the smoke stick by hand into the formed loops. The sausage loops are then hung with the smoke stick on holding arms 12 into hooks 15 and can then be aligned by an operator and moved by correspondingly positioning the clip device 9 at the ends or also at locations where closing is required, for example after skin bursting, so that easy clipping is possible. It is also possible to already close the sausage loops, as long as they are still hung onto hooks 6, by lifting the corresponding sausage sections towards clipper 9, which is especially easily possible if the shortest distance between transportation hook path and clipper is chosen to be between 10 and 25 cm.

Hence, the arrangement of the clip device 9 on the transportation device permits very easy handling, which is especially of great advantage in the processing of sausages that are to be filled into natural intestine casings or skins. It is especially in this field that clipping has often to be performed by hand because of frequently occurring skin bursting, which is easily possible with the arrangement of the clip device 9 according to the invention and thus considerably facilitates work.

We claim:

1. A device for supplying sausage strings made coherently in chains to a smoke stick, comprising a transportation device including rotating transportation hooks to which the sausages are transferred from a portioning machine (1), and a closing device (9) for clipping the beginning and end of a skin length or right and left of a place where the skin has been damaged is arranged on said transportation device (5), said closing device being movably supported at least over part of the longitudinal extension of said transportation device.

2. A device according to claim 1, wherein said closing device (9) is arranged at a height (h) corresponding to the standard working height of a standing person (80 cm to 140 cm) on a support (11) around which said transportation hooks (6) rotate continuously, said closing device being guided on a transportation belt (14).

3. A device according to claim 1, and spaced-apart holding arms (12) arranged approximately at the working height of said closing device (9) for receiving a smoke stick.

4. A device according to claim 3, wherein the distance (a) between a smoke stick received on said holding arms (12) and the closing surface (F) of said closing device (9) is about 10 to 25 cm.

5. A device according to claim 4, wherein the shortest distance (b) between the transportation hook plane ($E_T$) and said closing surface (F) of said closing device (9) is about 10 to 25 cm.

* * * * *